United States Patent [19]

Hagen

[11] Patent Number: 5,445,030
[45] Date of Patent: Aug. 29, 1995

[54] SPHERICAL COUPLING

[75] Inventor: Terry L. Hagen, Corona, Calif.

[73] Assignee: Wyle Laboratories, El Segundo, Calif.

[21] Appl. No.: 132,749

[22] Filed: Oct. 6, 1993

[51] Int. Cl.6 .............................................. B04B 3/00
[52] U.S. Cl. ....................................... 73/663; 73/662
[58] Field of Search ................ 73/662, 663, 665, 664

[56] References Cited

U.S. PATENT DOCUMENTS

| | | | |
|---|---|---|---|
| 3,369,393 | 2/1968 | Farmer | 73/663 |
| 3,699,807 | 10/1972 | Kerley, Jr. et al. | 73/665 |
| 3,947,077 | 3/1976 | Berg . | |
| 4,385,524 | 5/1983 | Cappel . | |
| 4,422,334 | 12/1983 | Yasuda . | |
| 4,436,188 | 3/1984 | Jones . | |
| 4,567,772 | 2/1986 | Hudson . | |
| 4,602,555 | 7/1986 | Bushey | 73/665 |
| 4,776,217 | 10/1988 | Nolan . | |
| 4,991,443 | 2/1991 | Fowler . | |
| 5,099,750 | 3/1992 | Rebel . | |

FOREIGN PATENT DOCUMENTS 1673903  8/1991  U.S.S.R. .............................. 73/665

Primary Examiner—Richard E. Chilcot, Jr.
Assistant Examiner—Max H. Noori
Attorney, Agent, or Firm—Freilich Hornbaker Rosen

[57] ABSTRACT

A bearing assembly (22, FIG. 4) is provided for connecting an actuator (14A) to a shake table (12) on which a test object is mounted, which minimizes the mass to be moved by the actuator. The bearing assembly is of the type that includes upper and lower spherical bearings (30, 32) that each has inner and outer spherical members (36, 38 and 40, 42), an outside transmit member (54) which couples the outer members, and a shaft (70) which couples the inner members. The inner members are formed of a more rigid material such as steel, than the outer members which are formed of aluminum, for more closely equalized deflection of the engaged members at high loads. The shaft has an upper end (72) which is fastened to and projects above the inner member of the upper spherical bearing, and that lies in a recess (90) formed in the underside of the shake table. The outer member of the lower spherical bearing has a radially outer flange (122) which is divided into fingers, with the space between fingers being greater than the space occupied by the fingers.

10 Claims, 3 Drawing Sheets

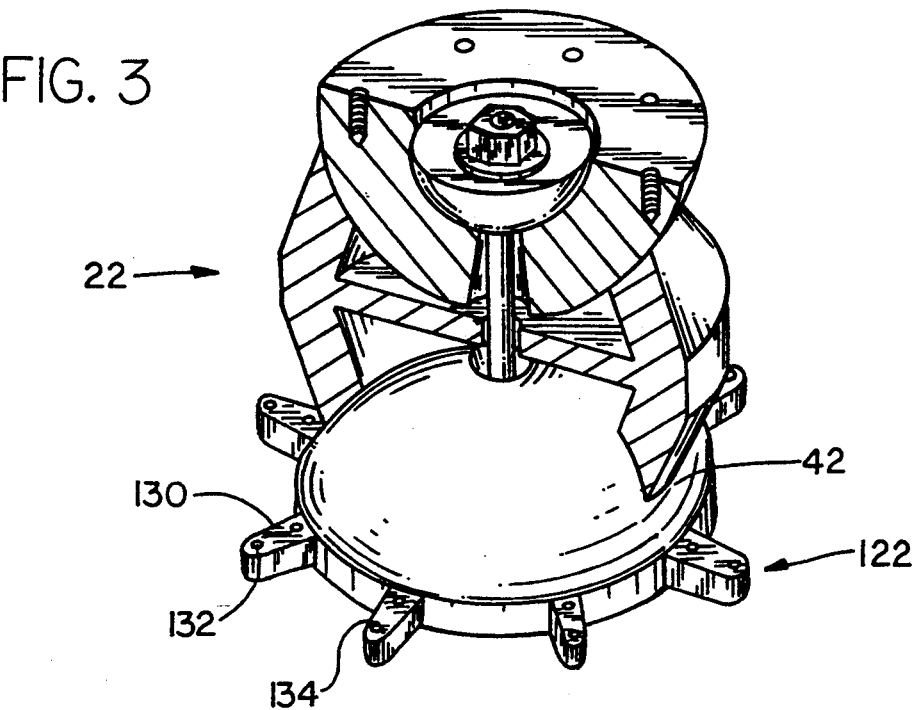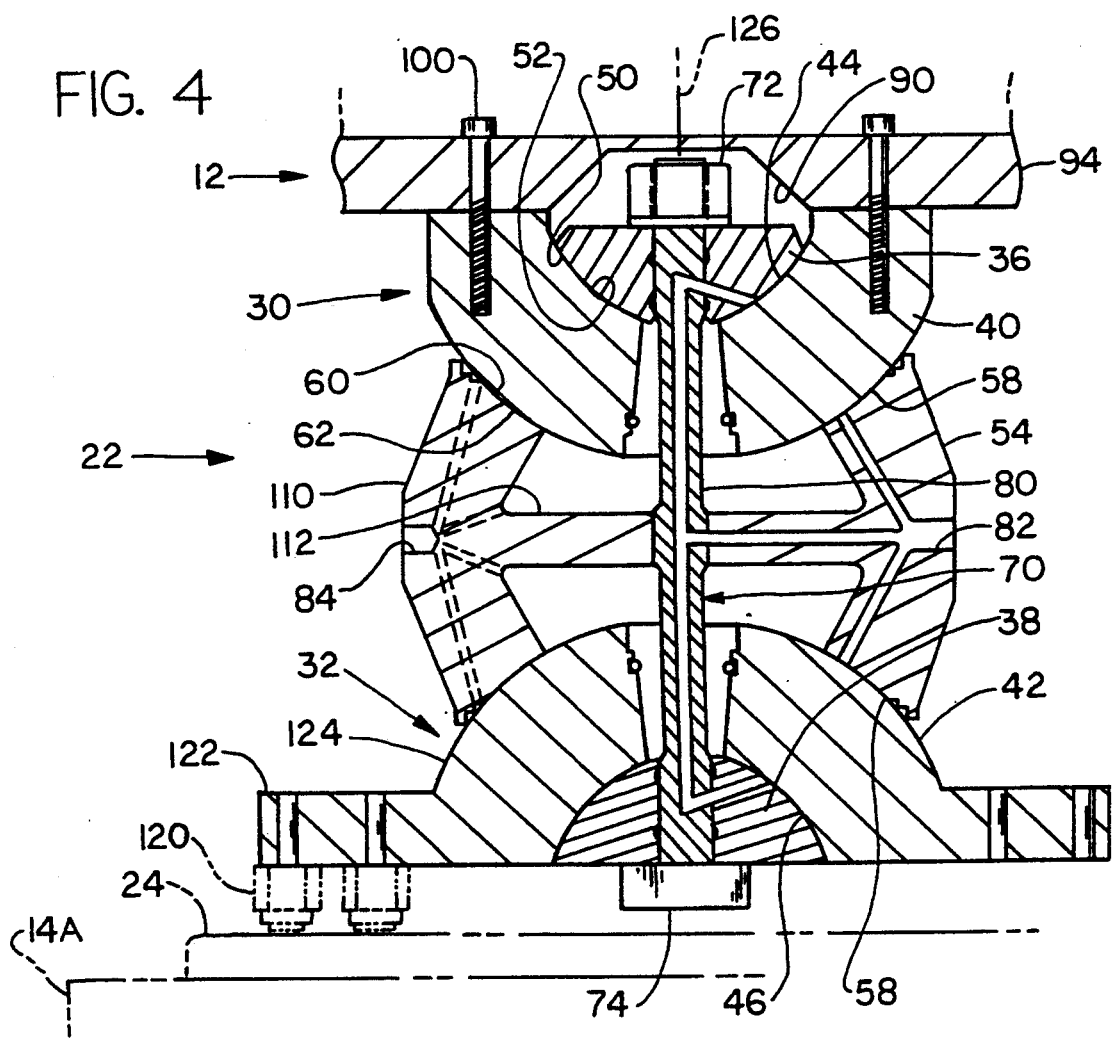

SPHERICAL COUPLING

BACKGROUND OF THE INVENTION

Shaker tables are used to test objects under conditions of violent shaking, such as parts of a missile that will be subjected to large vibrations in use, or scale models of buildings or other structures that may be subjected to violent shaking in an earthquake. A shake table apparatus may include a table on which a test object is mounted, actuators for shaking the table, and couplings for connecting the actuator to the table. In many tests, the table is shaken not only in a vertical or Z direction, but in perpendicular horizontal X and Y directions. Accordingly, the couplings that connect the vertical actuators to the table, must permit some horizontal table movement while the table is shaken vertically.

For actuators of given capacity, the mass that can be shaken to a given acceleration level, or the acceleration level that can be achieved for a given mass to be tested, depends to a large extent upon the mass of the couplings and the bearing assemblies thereof. A common type of bearing assembly includes upper and lower bearings that each have inner and outer engaged spherical members. A shaft connects the upper and lower inner members, and an outside transmit member couples the upper and lower outer members. The bearing assemblies constitute a large part of the mass that is shaken. In one example, the test object weighs 150 pounds, the table weighs 400 pounds, and each of four bearings that couple four vertical actuators to the table, weighs 300 pounds. Thus, the mass of 1200 pounds for the four bearing assemblies constitutes a major portion of the total mass to be shaken vertically. Four additional bearing assemblies that couple four horizontal actuators to the table, have portions that move vertically with the table and therefore constitute additional mass that must be shaken vertically. If the mass of the bearings could be reduced, this would allow a shake table apparatus with the same actuators and table, to be shaken at much greater acceleration levels, or allow a much larger object to be shaken at a given acceleration level.

SUMMARY OF THE INVENTION

In accordance with one embodiment of the present invention, a bearing assembly is described for connecting an actuator to a shake table or the like, which minimizes the mass that must be moved by the actuator. The bearing assembly includes an upper bearing with inner and outer members having engaged spherical bearing surfaces. The inner member has a smaller average thickness than the outer member, and is constructed of material having a greater rigidity than the material of the outer member, to produce more nearly equal deflections under load. A shaft which is connected to the inner member of the upper bearing, includes a shaft upper end which extends above the top of both the inner and outer members. The table has a recess in its lower surface which receives the top of the shaft, to enable the outer member to be attached directly to the table. The outer member of the lower bearing has a radially outer flange which is coupled to the actuator. The outer flange is divided into radially extending fingers, with the space between fingers being greater than the space occupied by the fingers themselves. An outside member that couples the outer members of the upper and lower bearings, includes a hollow shell portion and a cross portion that extends within the hollow portion and which closely surrounds the shaft.

The novel features of the invention are set forth with particularity in the appended claims. The invention will be best understood from the following description when read in conjunction with the accompanying drawings.

BRIEF DESCRIPTION OF THE DRAWINGS

FIG. 3 is a partial sectional view of one of the bearing assemblies of the apparatus of FIG. 2.

FIG. 4 is a sectional view of the bearing assembly of FIG. 3, with its axis extending vertically with respect to a horizontal table member.

DESCRIPTION OF THE PREFERRED EMBODIMENT

Figure 1:
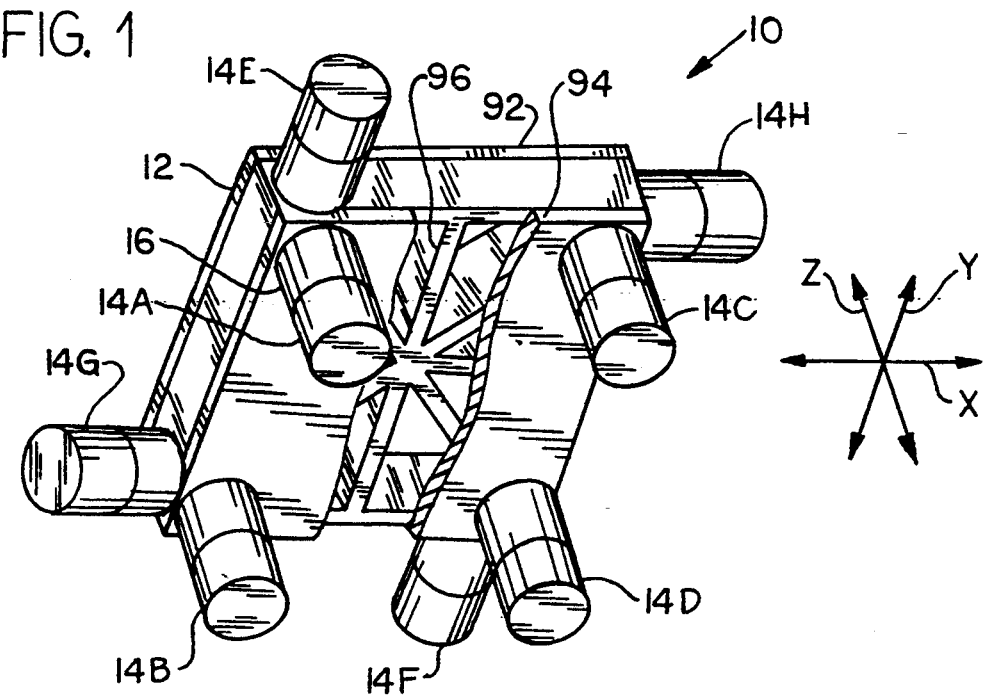
FIG. 1 is a bottom isometric view of a shake table apparatus of the present invention, but with the actuators and couplings shown in a simplified manner.
Figure 2:
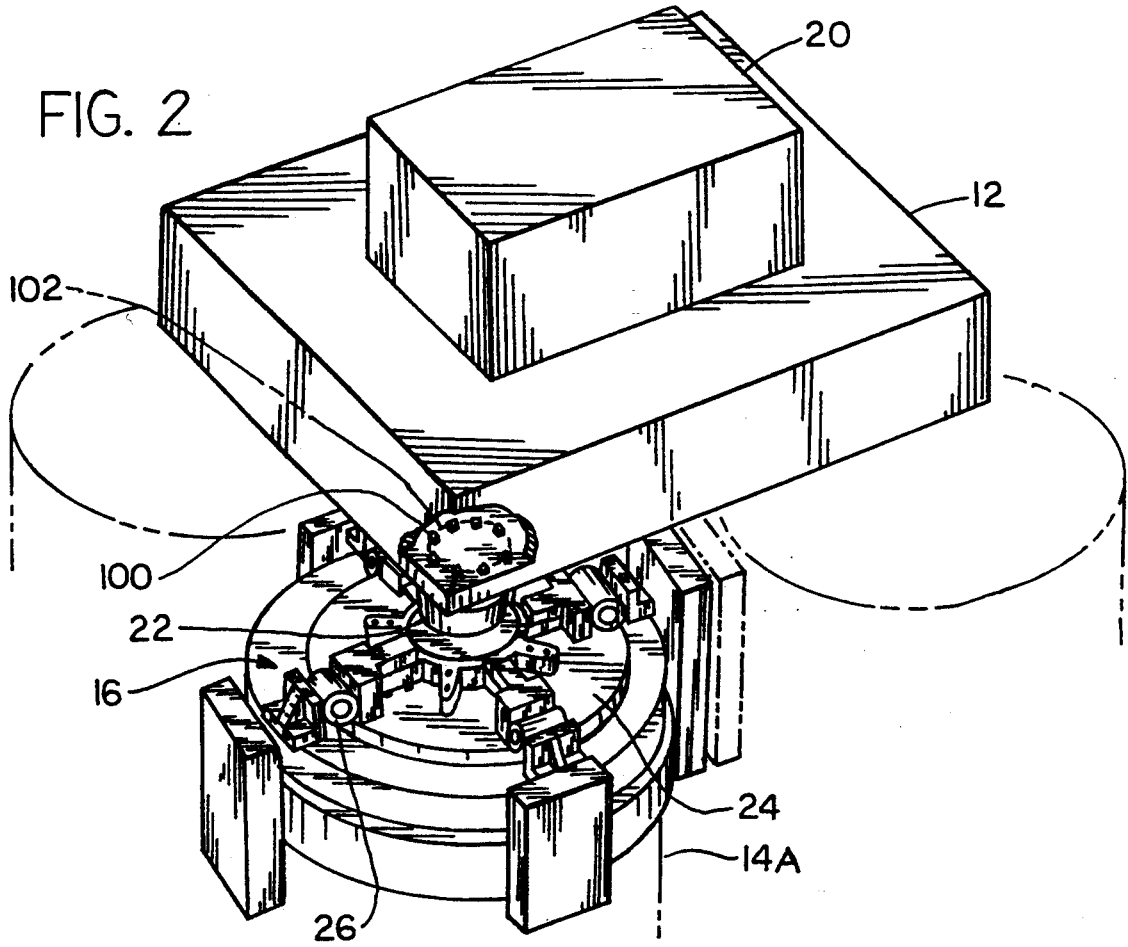
FIG. 2 is a top isometric view of the shake table apparatus of FIG. 1, showing only some of the actuators, and showing one of the actuators and couplings in detail.
Figure 6:
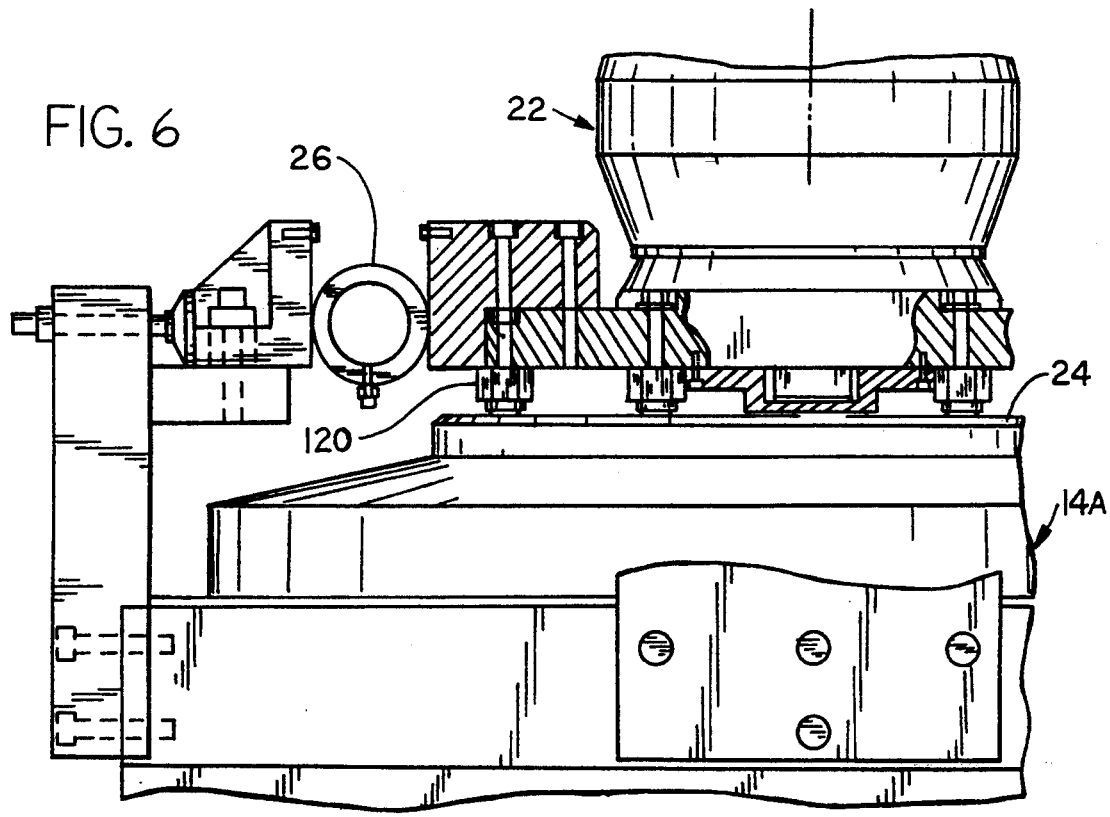
FIG. 6 is a partial sectional view of the coupling apparatus of FIG. 2.

FIG. 1 illustrates a shake table apparatus 10 of the type that is commonly used to test an object under severe conditions of vibration. The apparatus includes a table 12, a group of actuators 14A–14H, and a coupling that couples each actuator to the table. It is noticed that there are four actuators 14A–14D oriented in the vertical direction Z, to support the weight of the table and object while vibrating them vertically, and two actuators for controlling horizontal movement in each of two horizontal directions X, Y of the table. FIG. 2 illustrates a test object 20 mounted on the table 12, and shows some details of one of the actuators 14A and the coupling apparatus 16. The coupling apparatus includes a bearing assembly 22 which is mounted on a piston 24 of the actuator and includes side coupling devices 26 that prevent sideward movement of the bearing assembly 22 with respect to the actuator.

FIG. 4 illustrates some details of the bearing assembly 22 which couples the actuator 14A to the table 12. The bearing assembly includes upper and lower spherical bearings 30, 32 that each includes an inner bearing member 36, 38 and an outer bearing member 40, 42. The inner and outer members bear against each other at a partially spherical interface 44, 46. Each member such as the upper inner member 36 has a partially spherical outer surface 50 while the upper outer member 40 has a corresponding partial spherical inner surface 52. In the particular bearing assembly shown, each spherical surface extends by about a hemisphere.

The bearing assembly includes an outside transmit member 54 which transmits compressive loads between the upper and lower outer members 40, 42. The outside transmit member is coupled to the upper and lower outer members at partially spherical interfaces 56, 58. At each of these interfaces, the outside transmit member has a partially spherical inner surface 60 which engages a partially spherical surface 62 at the outside of the corresponding outer member such as 40.

The bearing assembly includes a shaft 70 which transmits tension loads. The shaft has upper and lower ends 72, 74 coupled to the upper and lower inner members 36, 38. The shaft includes a central rod 80. For the particular shaft 70, the lower end 74 is formed by an enlargement integral with the rod, while the upper end 72 is formed by a nut threadably connected to a threaded upper end of the rod. The nut at 72 is tightened to assure that all engaged spherical surfaces lie firmly against each other. It may be noted that the bearing assembly is a hydraulic type which receives pressured hydraulic fluid at an inlet port 82 which lies opposite an outlet port 84, and distributes it to the spherical interfaces for low friction engagement of the moving parts.

As mentioned earlier, the mass of the bearing assembly 22 constitutes a major portion of the mass that must be moved by the actuators such as 14A. For example, one system that applicant has designed is of the general construction shown in FIG. 1, and includes eight actuators and corresponding coupling for vibrating a table having a mass of about 400 pounds. In one series of tests, a missile component having a mass of 150 pounds was strapped to the table for vibration tests. Prior art bearing assemblies weighed about 300 pounds each, for a total mass of just the four vertical bearings, of about 1200 pounds. The total mass to be moved vertically in the prior art system is the mass of the four prior art vertical bearing assemblies, which equals 1200 pounds, plus the 550 pounds for the table and object, for a total of 1750 pounds. Applicant's weight-reducing bearing assemblies each weighs about 100 pounds, for a total of 400 pounds for the four bearing assemblies, or a total of 950 pounds to be moved vertically by the actuators. The four shakers can apply a vertical force of 240,000 pounds. As a result, the use of the prior art bearing assembly produced a theoretical maximum of about 135G acceleration, while the system using applicant's reduced-weight bearing assemblies resulted in a theoretical maximum acceleration of about 250G. In actuality, the masses of those portions of the horizontal bearing assemblies (14E-14H) which move vertically, result in a somewhat lower maximum acceleration, such as about 200G versus about 100G. Alternatively, applicant's reduced mass bearing assemblies allow the same acceleration forces to be applied to a test object of much larger mass than previously, using the same actuators.

One way in which applicant reduces the mass of the bearing assembly 22 (FIG. 4) is to construct the outer members 40, 42 and outside transmit member 54 of a light weight metal such as aluminum, with the thickness of the parts increased to achieve the same required rigidity. However, each of the inner members 36, 38 is constructed of a material of high rigidity such as steel. The inner members such as 36 have a much smaller average vertical thickness than the outer members such as 40. If both inner and outer members were constructed of the same material, then the inner member 36 would undergo greater bending, which could result in high friction between the parts. By constructing the inner members such as 36 of much more rigid material, applicant achieves about the same degree of rigidity against bending as the outer member, so the inner and outer member bend about the same under heavy load and therefore the surfaces remain substantially parallel to produce low friction contact between them. Aluminum of the outer member 40 has a Young's Modulus of elasticity of about 10,000,000 psi, as compared to steel of the inner member 36 which has a Young's Modulus of 30,000,000, it may be noted that stainless steel has a Young's Modulus of 28,500,000, which is still much greater than that of aluminum. By using the two materials of very different stiffnesses (one has a Young's Modulus at least 25% greater and preferably at least 100% greater, than the other), applicant is able to reduce the weight of the outer members while still achieving reliable low friction contact between the members.

Another approach that applicant uses to reduce the mass of the bearing assembly, is to form the table 12 with a recess 90 in its lower surface. FIG. 1 illustrates the actual construction of the table, which includes upper and lower plates 92, 94 and a beam structure 96 connecting them. As shown in FIG. 4, applicant forms a recess 90 in the lower plate 94. Vertical forces applied to the table 12 are applied through the outer member 40. The outer member 40 is connected by a group of bolts 100 to the lower plate 94 of the table. As shown in FIG. 2, the bolts 100 are arranged substantially along an imaginary circle 102. Since the forces are transmitted to a circular region lying about the recess 90 (FIG. 4), the weakening of the lower plate at the recess 90 does not affect the strength of the table. The upper end 72 of the shaft lies in the recess.

Another way in which applicant reduces the weight of the bearing assembly 22 is by forming the outside transmit member 54 so it is largely hollow, with a shell portion 110 that forms partial spherical surfaces at the upper and lower ends of the transmit member. However, the transmit member includes a cross portion 112 of plate-like shape, which closely surrounds the shaft 70, so that the shaft and outside transmit member tend to pivot together.

The lower outer member 42 is coupled to the actuator 14A largely by coupling rods 120 that extend down from a flange portion 122 of the lower outer member to the top of the actuator piston 24. The flange portion 122 lies radially outside the center region formed by the spherical inner portion 124 of the lower outer member 42, with respect to the axis 126 of the bearing assembly. In prior bearing assemblies, the flange portion 122 was in the form of a continuous ring. As shown in FIG. 3 applicant forms the outer flange portion 122 so it consists of several outwardly projecting fingers 130 that have holes 132 for connection through members to the actuator piston. The fingers 130 are circumferentially spaced far enough that the space 134 between adjacent fingers occupies a greater volume than the volume of a single finger.

Figure 5:
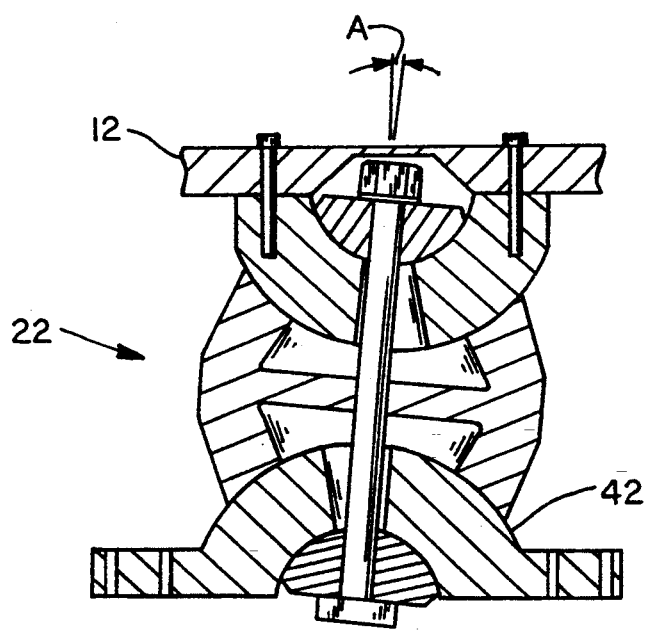
FIG. 5 is a view similar to that of FIG. 4, but with the axis of the bearing assembly angled from the vertical.

The purpose of the horizontal actuators 14E-14H is to closely control table movement perpendicular to the vertical direction. Usually, only a limited distance of horizontal shaking occurs. FIG. 5 shows a maximum pivoting of the bearing assembly by an angle A of only about 5° which results in only small sideward shifting.

Although the shake table apparatus is usually oriented with at least one actuator that moves the table vertically, the apparatus can be used in other orientations with respect to gravity. Thus, while certain parts have been illustrated and described as "upper" or "lower" parts, and directions such as "horizontal" and "vertical" have been used to aid in the description, the apparatus can be used in other orientations. It is noted that in some situations, the bearing assemblies can be connected directly to the object to be tested in which case the test object becomes the table to be shaken.

Thus, the invention provides a shake table apparatus, and especially a bearing assembly thereof which couples the actuator to the table, wherein the bearing assembly is of light weight. Several modifications to prior bearing assemblies achieve the light weight. The inner and outer members of the upper and lower bearing are formed of different material, with the inner member having a smaller thickness and being constructed of a rigid material such as steel, as compared to the thicker outer member which is formed of a less rigid material such as aluminum, to save weight while producing comparable deflection of the members so they remain in contact under heavy load. The top of the shaft which couples the upper and lower inner members, and which projects above the upper inner member, is accommodated by forming a recess in the table, instead of resorting to a separate mounting plate to connect the upper outer member to the table. The upper outer member is connected to the table through a group of fasteners such as bolts which lie in a circle about the recess, so the recess does not decrease the strength of the load-carrying part of the table. An outside transmit member which transmits compressive load between the upper and lower outer members, is of hollow ring-shaped design, with a shell portion and with a plate-like cross portion that closely surrounds the shaft. The flange portion on the lower outer member, which is coupled to the actuator, is formed with a plurality of circumferentially-spaced fingers that are each coupled to the actuator, thereby eliminating the mass of flange portions between the fingers which do not transmit substantial force.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. A shake table apparatus which includes a table, at least one actuator and at least one bearing assembly which transmits force between said actuator and said table while allowing shifting of the table relative to the actuator, wherein said bearing assembly includes upper and lower spherical bearings, each including an inner member with a partial spherical outer surface and an outer member with a partial spherical inner surface engaged with said outer surface, an outside transmit member which couples said outer members and a shaft which couples said inner members, at least said outer member of said upper spherical bearing having a greater average thickness than the corresponding inner member, characterized by:

said inner member of said upper spherical bearing is formed of a material having a greater Young's Modulus of Elasticity, than the material of the outer member of said upper bearing, to thereby more closely equalize bending of the inner and outer members of said upper spherical bearing, with the material of said outer member having a lower density than the material of said inner bearing.

2. The shake table apparatus described in claim 1 wherein:

said inner member of said upper spherical bearing is formed of steel having a Young's Modulus of elasticity of about 30,000,000 psi while said outer member of said upper spherical bearing is formed of aluminum having a Young's Modulus of elasticity of about 10,000,000 psi.

3. The shake table described in claim 1 wherein:

said shaft has an upper end which is fastened to said inner member of said upper spherical bearing and which projects above both said inner and outer members of said upper spherical bearing;

said table includes a plate and said outer member of said upper spherical bearing is fastened to said plate at a plurality of locations spaced in largely a circle about said shaft upper end, and said table has a lower surface with a recess which lies within said circle and which receives said shaft upper end.

4. The shake table described in claim 1 wherein:

said outer member of said lower spherical bearing has an axis and has a radially outer flange portion which is coupled to said actuator, said flange portion comprising a plurality of fingers with spaces between adjacent fingers.

5. The shake table apparatus described in claim 1 wherein:

said outside transmit member includes a shell portion with upper and lower parts coupled to said outer members and a cross portion lying within said shell portion and extending across the inside of said shell portion and closely surrounding said shaft.

6. A shake table apparatus which includes a table, at least one actuator, and at least one bearing assembly which transmits force between said actuator and said table while allowing shifting of the table relative to the actuator, wherein said bearing assembly includes upper and lower spherical bearings, each including inner and outer members with partially spherical engaged surfaces, an outside transmit member which couples said outer members and a shaft which couples said inner members, characterized by:

said shaft has an upper end which extends above both said inner and outer members of said upper spherical bearing, with said shaft upper end abutting said inner member of said upper spherical bearing;

said table has a lower surface with a recess and said shaft upper end lies at least partially in said recess.

7. The shake table apparatus described in claim 6 wherein:

said table includes lower and upper table plates and a beam structure which connects said table plates;

said outer member of said upper spherical bearing is attached to said lower plate by a plurality of fasteners arranged substantially in a circle, and said recess lies in said lower plate and lies within said circle.

8. A shake table apparatus which includes a table, at least one actuator, and at least one bearing assembly which transmits force between said actuator and said table while allowing shifting of the table relative to the actuator, wherein said bearing assembly includes a lower outer bearing member with an axis and a center region and with a radially outer flange portion, and a plurality of fastener devices which hold each of a plurality of flange locations spaced about said axis to said actuator, characterized by:

said radially outer flange portion comprises a plurality of fingers radiating from the rest of said lower bearing member, with each of said fastener devices attached to one of said fingers, and with the circumferential space between adjacent fingers being greater than the circumferential space occupied by each finger.

9. The shake table apparatus described in claim 8 wherein:

said bearing assembly includes an upper outer bearing member and an outside transmit member which couples said outer bearing members, and said bearing assembly includes upper and lower inner bearing members each engaged with said one of said outer bearing members, and a shaft that couples said inner bearing members;

said outside transmit member includes a shell portion with upper and lower parts coupled to said lower and upper outer members and a cross portion lying within said shell portion and closely surrounding said shaft.

10. A shake table apparatus which includes a table, at least one actuator and at least one bearing assembly which transmits force between said actuator and said table while allowing shifting of the table relative to the actuator, wherein said bearing assembly includes upper and lower spherical bearings, each including an inner member with a partial spherical outer surface and an outer member with a partial spherical inner surface engaged with said outer surface, an outside transmit member which couples said outer members and a shaft which couples said inner members, at least said outer member of said upper spherical bearing having a greater average thickness than the corresponding inner member, characterized by:

said outside transmit member includes a shell portion with upper and lower parts coupled to said outer members and a cross portion lying within said shell portion and extending across the inside of said shell portion and closely surrounding said shaft.

* * * * *